United States Patent [19]
Pecchenino

[11] 4,073,401
[45] Feb. 14, 1978

[54] HEAT ACTIVATED FIRE-SAFE COVER ASSEMBLY

[75] Inventor: Paul L. Pecchenino, Felton, Calif.

[73] Assignee: Huggins Engineering Company, Santa Clara, Calif.

[21] Appl. No.: 723,324

[22] Filed: Oct. 18, 1976

[51] Int. Cl.² .................... B65D 25/00; B65D 43/24; B65D 55/00
[52] U.S. Cl. ................... 220/88 R; 220/201; 220/259; 220/335
[58] Field of Search .......... 220/88 R, 88 A, 1 T, 220/201, 334, 335, 256, 259

[56] References Cited
U.S. PATENT DOCUMENTS

| | | | |
|---|---|---|---|
| 1,511,982 | 10/1924 | Schilling | 220/1 T X |
| 1,606,935 | 11/1926 | Haas | 220/88 R |
| 1,863,793 | 6/1932 | Hermani | 220/94 A X |
| 2,452,118 | 10/1948 | Florence | 220/88 R |
| 2,474,934 | 7/1949 | Domagall | 220/88 R |
| 2,732,972 | 1/1956 | Anschicks | 220/335 X |

Primary Examiner—William Price
Assistant Examiner—Steven M. Pollard
Attorney, Agent, or Firm—Flehr, Hohbach, Test, Albritton and Herbert

[57] ABSTRACT

A heat-activated fire extinguishing cover assembly comprising a top closure member adapted to extend across the open upper end of a container and form a lid thereto, an unobstructed opening formed through said member for disposing articles into the container, means carried by said member and overlying said opening to form a flue for heat to pass out of the container, a door movable between open and closed positions relative to said opening, and heat destructible latch means retaining said door in its open position until sufficiently weaked by heat to release said door.

5 Claims, 4 Drawing Figures

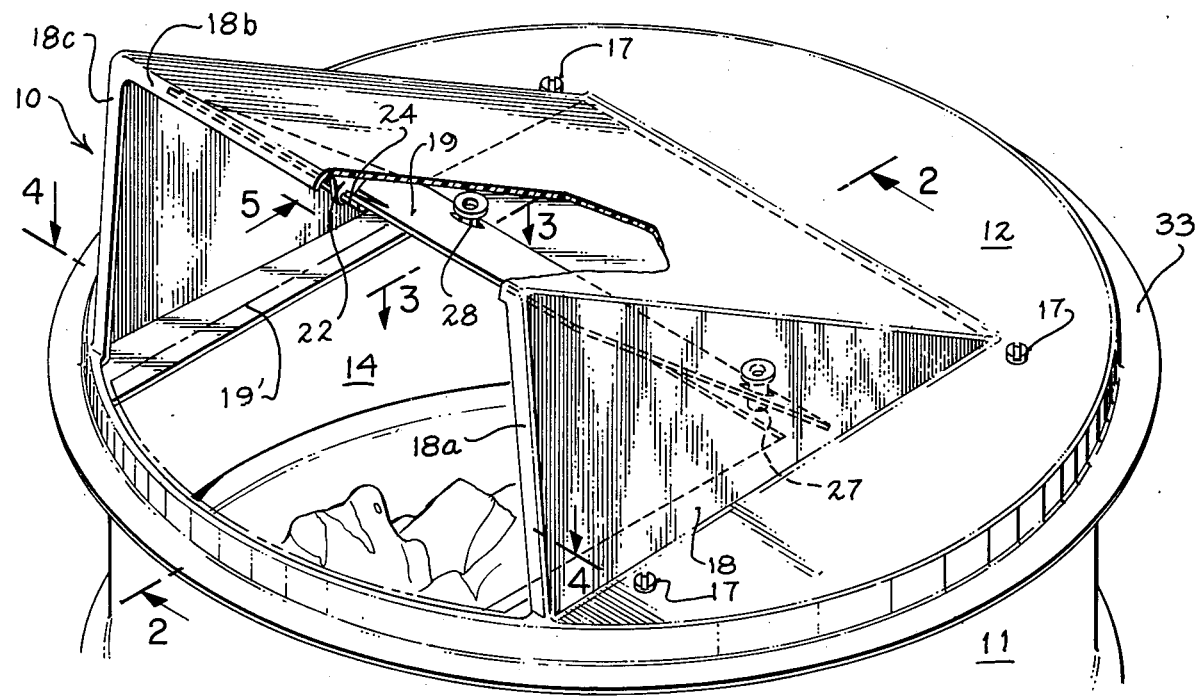
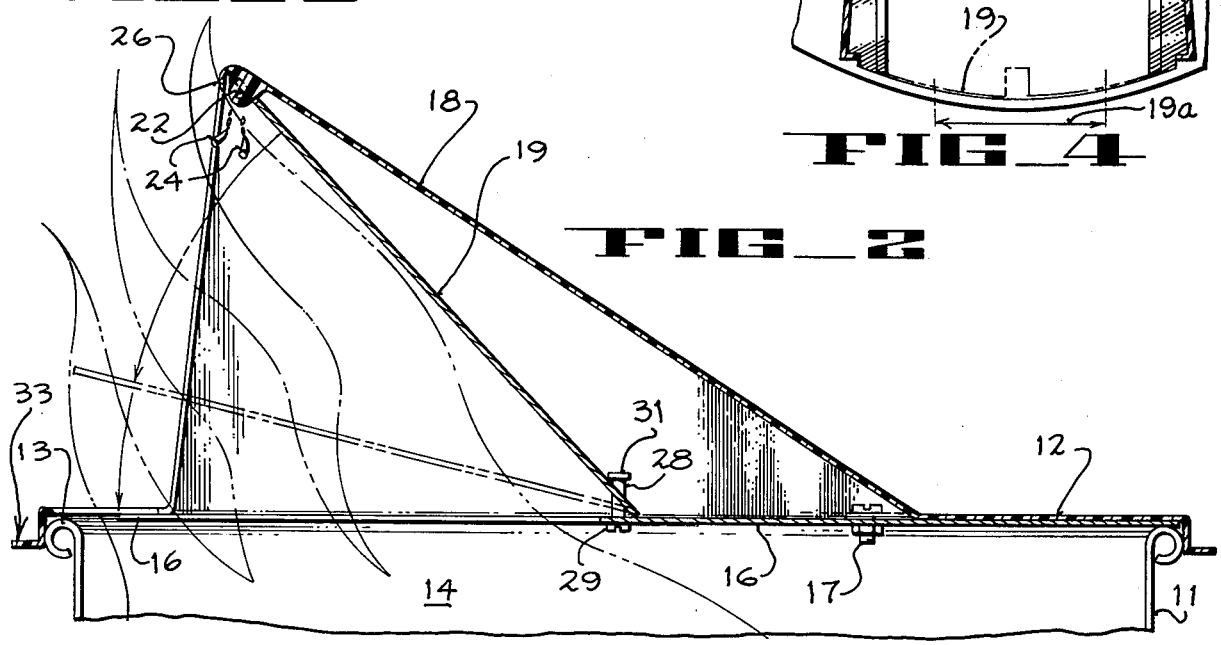

HEAT ACTIVATED FIRE-SAFE COVER ASSEMBLY

BACKGROUND OF THE INVENTION

This invention pertains to self-extinguishing trash containers and more particularly to an improved cover assembly for same.

Heretofore trash containers of a type having self-extinguishing features have typically been characterized as requiring complex structures as well as sophisticated and expensive components.

According to the present invention a relatively inexpensive cover assembly for a container has been provided using relatively simple parts but having significant functional advantages.

In the past devices which have been operated by means of springs and the like have tended to become rusted in a permanently open position whereby upon encountering a fire therein the closure fails to function properly.

SUMMARY OF THE INVENTION AND OBJECTS

Generally as described further below there has been provided herein a heat activated fire extinguishing cover assembly for forming an oxygen starved condition within a container comprising a top closure member adapted to extend across the open upper end of the container thereby forming a lid for the container. An unobstructed opening is formed through the top closure member for disposing articles into the container. A door and means disposing the door to be movable between open and closed position relative to the opening in the top closure member is arranged whereby the door when in its open position serves to permit the entry of articles into the container. When the door is in its closed position it sufficiently seals the opening so as to extinguish fire within the container by limiting the supply of oxygen thereto. A heat destructable latch means retains the door in its open position until sufficiently weakened or destroyed by heat to release the door to move to close the opening.

In general, it is an object of the present invention to provide an improved and simplified heat-activated fire extinguishing cover assembly.

A particular object of the present invention is to provide a heat-activated fire extinguishing cover assembly characterized by a movable door which is protected against becoming inoperative due to corrosion and the like resulting from exposure over a long period.

The foregoing and other objects of the invention become more readily evident from the following detailed description of a preferred embodiment when considered in conjunction with the accompanying drawings.

BRIEF DESCRIPTION OF THE DRAWINGS

FIG. 1 shows a perspective view of a cover assembly according to the invention;

FIG. 2 shows an elevation section view taken along the line 2—2 of FIG. 1;

FIG. 3 shows an enlarged plan view of a detail along line 3—3 of FIG. 2 and surrounding one of the hinged posts, according to the invention;

FIG. 4 shows a plan view in detail of the door in its closed position taken along the line 4—4 of FIG. 2;

FIG. 5 shown an enlarged detail view taken in the region designated by the arrow 5 in FIG. 1, according to the invention.

DETAILED DESCRIPTION OF THE PREFERRED EMBODIMENT

A heat-activated fire extinguishing cover assembly 10 is arranged to create an oxygen starved condition within the storage container 11 in response to burning within container 11. Thus assembly 10 includes a top closure member 12 adapted to extend across the open upper end of container 11 and form a lid thereto. Closure member 12 rests upon the bead 13 formed around the upper end edge of container 12 and serves to provide a seal therearound.

An unobstructed opening 14 is formed through closure member 12 for disposing articles into container 11. The underside of closure member 12 is protected by means of the flash plate or liner 16 secured thereto by means of the screws 17.

Means such as the hood 18 carried by member 12 and preferably formed as a molded portion thereof overlies opening 14 to form a flue for passing heat out of container 11.

Means are provided for closing off opening 14 in response to sensing a limited degree of heat. Thus a hatch cover or door 19 is arranged to move from its raised position as shown in FIG. 2 to a lowered closing position as indicated by the phantom line 19' defined around the margin of opening 14. Thus door 19 is movable between open and closed positions relative to opening 14. Door 19 when in its open position serves to permit entry of articles into container 11 and when in its closed position it serves to sufficiently seal opening 14 so as to extinguish fire within the container by limiting the supply of oxygen thereto.

Heat destructable latch means as now to be described comprises an opening 21 in door 19 whereby a first element such as the depending ear 22 is carried by hood 18 to extend downwardly through opening 21 to be directly exposed to heat and flame, if any, from within container 11.

The depending ear 22 includes a tapered transverse opening 23 therethrough adapted to receive a tapered retaining pin 24 therein preferably of a material having a very low melting point on the order of 158° F, whereby upon commencement of a fire within container 11 the heat will be sufficient to cause pin 24 to be melted and release door 19 under its own weight to close opening 14 thereby putting out the fire by starving the fire for oxygen.

In addition ear 22 can be made of a flammable plastic material readily destructible upon encountering the heat or flame from a fire in container 11. Thus at least one of the two elements 22, 24 must be sufficiently destructible under the heat of a fire within container 11 and under the weight of door 19 to release door 19 to close opening 14.

The passage into hood 18 is bounded by the edges 18a, b, c. The top edge 18b of the passage formed by these edges is bounded by a downwardly extending protective edge 26. The transverse opening 23 in protruding ear 22 is disposed at a position so as to cause pin 24 to retain door 19 sufficiently elevated to dispose the central portion 19a of the leading edge of door 19 at a protected position behind edge 26 so as to guard against cutting a person's hand when passing articles into container 11 via hood 18 (and opening 14).

As adverted to above a cover assembly of the kind described may remain exposed for many months or even years before it is necessary to operate door 19 to put out a fire in container 11. Accordingly after such a period of time if the construction has become severely corroded it will not properly function. Accordingly, as provided herein a corrosion proof "hinge" has been employed whereby the means disposing the door to be movable between open and closed positions relative to opening 14 comprises a plurality of posts 27, 28 each of which is provided with a threaded interior adapted to receive the threads of an associated screw 29. Accordingly each of posts 27, 28 is secured within hood 18 to liner 16 and disposed to protrude upwardly within hood 18. The top of each post 27, 28 includes an enlarged cap portion for retaining door 19 thereon.

As shown best in FIG. 3 posts 27, 28 are quite loosely disposed within an associated opening 32 formed through door 19.

Openings 32 in addition to providing excessive width to permit easy movement along the axis of each of the two posts 27, 28 are formed with an oblong shape whereby door 19 will not "bind" as it falls downwardly to overlay opening 14.

An encircling rigid flange 33 extends radially of closure member 12 and serves to provide means for lifting the assembly from container 11.

In operation, closure assembly 10 normally permits unobstructed access to the contents of container 11 whereby articles such as rags and the like can be thrown into the container via hood 18. In the event that fire should break out within container 11 the heat and smoke generated pass upwardly through the flue formed by the opening defined by the edges of hood 18 and opening 14. In the embodiment shown the hood 18 serves to direct the heat toward the destructable latch pin 24 whereby in the normal instance the latch pin 24 will melt at a very low temperature such as 158° F and thereby permit the weight of door 19 to cause it to fall downwardly as shown in FIG. 2 to close opening 14.

In the event that container 11 has been filled with materials which invade the space of opening 14 at the time a fire occurs the free "hinging" arrangement provided by the posts 27, 28 serves to permit door 19 to fall downwardly onto the top of the material piled into and invading a portion of opening 14 without causing the door to become bound-up and locked in a partially open position. In fact, as the material burns, door 19 settles along posts 27, 28 downwardly to a position which ultimately seals opening 14 about the marginal edges thereto.

From the foregoing it should be readily evident that there has been provided an improved heat activated fire extinguishing cover assembly.

What is claimed is:

1. A heat activated fire extinguishing cover assembly for forming an oxygen starved condition within a container comprising a top closure member adapted to extend across the open upper end of the container and form a lid thereto, an unobstructed opening formed through said member for disposing articles into the container, a door and means disposing said door to be movable between open and closed positions relative to said opening, said door when in said open position serving to permit the entry of articles into the container, and when in said closed position serving to sufficiently seal said opening so as to extinguish fire within the container by limiting the supply of oxygen thereto, said top closure member including a hood forming a flue opening disposed above the first named said opening, carried by an edge portion of said flue opening and heat destructible latch means engaging the underside of the forward edge margin of said door for retaining said door in its open position until sufficiently weakened by heat and the weight of the door to release the door to move to close said opening.

2. A heat activated fire extinghishing cover assembly for forming an oxygen starved condition within a container comprising a top closure member adapted to extend across the open upper end of the container and form a lid thereto, an unobstructed opening formed through said member for disposing articles into the container, a door and means disposing said door to be movable between open and closed positions relative to said opening, said door when in said open position serving to permit the entry of articles into the container, and when in said closed position serving to sufficiently seal said opening so as to extinguish fire within the container by limiting the supply of oxygen thereto, heat destructible latch means retaining said door in its open position until sufficiently weakened by heat to release the door to move to close said opening, said means disposing said lid to be movable between open and closed positions relative to said opening comprising post means extending upwardly from the plane of said top closure member, said post means being relatively loosely coupled to pass through said door while permitting said door to fall freely to cover the first named said opening.

3. A heat activated fire extinguishing cover assembly for forming an oxygen starved condition within a container comprising a top closure member adapted to extend across the open upper end of the container and form a lid thereto, an unobstructed opening formed through said member for disposing articles into the container, a door and means disposing said door to be movable between open and closed positions relative to said opening, said door when in said open position serving to permit the entry of articles into the container, and when in said closed position serving to sufficiently seal said opening so as to extinguish fire within the container by limiting the supply of oxygen thereto, heat destructible latch means retaining said door in its open position until sufficiently weakened by heat to release the door to move to close said opening, said means disposing said door to be movable between open and closed positions relative to said opening comprising a plurality of posts extending upwardly from the plane of said top closure member, each of said posts being loosely disposed within an associated opening formed through said door, each post being provided with an enlarged cap to loosely retain said door thereon.

4. In a cover assembly for a container comprising a top closure member adapted to extend across the open upper end of a container and form a lid thereto, an unobstructed opening formed through said member for disposing articles therethrough, a liner of non-flammable material secured in protective relation beneath said top closure member and having an opening therethrough corresponding to the first named opening, a hood overlying the first named said opening, said hood having an opening adapted to receive articles therethrough and to form a flue with respect to heat rising upwardly from the container, a door disposed within said hood to move between open and closed positions relative to the first named opening, heat destructible latch means carried by the edge margin around said hood opening and disposed in the leading edge of said flue for retaining said door in its open position until sufficiently destroyed by heat in said flue to release the door to close the first named said opening to extinguish burning in the container.

5. A heat-activated fire extinguishing cover assembly for forming an oxygen starved condition within a container comprising a top closure member adapted to extend across the open upper end of the container and form a lid thereto, an unobstructed opening formed through said member for disposing articles into the container, means carried by said member and overlying said opening to form a flue for heat to pass out of the container, a door movable between open and closed positions relative to said opening, said door when in said open position serving to permit the entry of articles into the container, and when in said closed position serving to sufficiently seal said opening so as to extinguish fire within the container by limiting the supply of oxygen thereto, heat destructible latch means disposed in the flue, said latch means retaining said door in its open position until sufficiently weakened by heat to release the door to move to close said opening, said latch means comprising an opening in said door, a first element carried by the first named means to extend downwardly through said door opening, and a second element engaging said first element to retain said door in its said open position, at least one of said elements being sufficiently destructible under heat of a fire within the container and the weight of the door to release the door to close the first named said opening, said first element comprising a protruding ear formed with an opening therethrough and disposed and adapted to extend through said door opening when said door is disposed in its open position, and said second element comprising a peg of very low melting point material disposed in the opening of the ear but beneath the door to retain said door thereabove until released by destruction of the peg or ear.

* * * * *